(12) United States Patent
Kogoi et al.

(10) Patent No.: US 7,425,287 B2
(45) Date of Patent: Sep. 16, 2008

(54) SURFACE MODIFICATION METHOD FOR INORGANIC OXIDE POWDER, POWDER PRODUCED BY THE METHOD AND USE OF THE POWDER

(75) Inventors: Hisao Kogoi, Toyama (JP); Jun Tanaka, Chiba (JP)

(73) Assignee: Showa Denko K.K., Tokyo (JP)

( * ) Notice: Subject to any disclaimer, the term of this patent is extended or adjusted under 35 U.S.C. 154(b) by 351 days.

(21) Appl. No.: 10/543,099

(22) PCT Filed: Jan. 23, 2004

(86) PCT No.: PCT/JP2004/000616

§ 371 (c)(1),
(2), (4) Date: Jul. 22, 2005

(87) PCT Pub. No.: WO2004/065495

PCT Pub. Date: Aug. 5, 2004

(65) Prior Publication Data

US 2006/0127669 A1    Jun. 15, 2006

Related U.S. Application Data

(60) Provisional application No. 60/443,529, filed on Jan. 30, 2003.

(30) Foreign Application Priority Data

Jan. 24, 2003    (JP) .............................. 2003-016402

(51) Int. Cl.
   C09C 3/06    (2006.01)
   C09C 1/40    (2006.01)
(52) U.S. Cl. ..................................................... 264/15

(58) Field of Classification Search .................. 264/15; 423/335, 592.1–594.19
See application file for complete search history.

(56) References Cited

U.S. PATENT DOCUMENTS 5,140,005 A * 8/1992 Rangaswamy et al. ...... 505/510

(Continued)

FOREIGN PATENT DOCUMENTS

EP    0 506 219 A    9/1992

(Continued)

OTHER PUBLICATIONS

Cheng-Hung Hung, et al, "Formation of Mixed Oxide Powders in Flames: Part I. $TiO_2$-$SiO_2$", Journal of Materials Research, vol. 7, No. 7, Jul. 1992, pp. 1861-1869, XP009025974.

*Primary Examiner*—C. Melissa Koslow
(74) *Attorney, Agent, or Firm*—Sughrue Mion, PLLC

(57) ABSTRACT

A surface modification method comprising bringing, into a high-temperature flame formed by use of a combustible gas and a combustion-supporting gas, inorganic oxide powder A having an average particle size falling within a range of 0.5 to 200 μm as measured by means of laser diffraction/scattering particle size analysis and inorganic oxide powder B having a particle size calculated on the basis of its BET specific surface area of 100 nm or less, to thereby modify the surfaces of particles of the powder A by means of the particles of the powder B. A surface modification method comprising bringing, into a high-temperature flame formed by use of a combustible gas and a combustion-supporting gas, the inorganic oxide powder A; and bringing again the resultant powder into the high-temperature flame, to thereby modify the surfaces of particles of powder A.

7 Claims, 4 Drawing Sheets

U.S. PATENT DOCUMENTS

| | | | |
|---|---|---|---|
| 5,340,781 A * | 8/1994 | Oda et al. | 501/127 |
| 5,512,094 A | 4/1996 | Linton | |
| 6,468,658 B2 * | 10/2002 | Lange et al. | 428/404 |

FOREIGN PATENT DOCUMENTS

| | | | |
|---|---|---|---|
| EP | 0 803 550 A | 10/1997 |
| JP | 63-185803 A | 8/1988 |
| JP | 63-248712 A | 10/1988 |
| JP | 02-199013 A | 8/1990 |
| JP | 3-2009 B2 | 1/1991 |
| JP | 03-259961 A | 11/1991 |
| JP | 6-210152 A | 8/1994 |
| JP | 2672671 B2 | 7/1997 |
| JP | 10-263380 A | 10/1998 |
| JP | 2001-19425 A | 1/2001 |
| JP | 2001-106521 A | 4/2001 |
| JP | 2001-146413 A | 5/2001 |
| JP | 2001-199719 A | 7/2001 |

* cited by examiner

SURFACE MODIFICATION METHOD FOR INORGANIC OXIDE POWDER, POWDER PRODUCED BY THE METHOD AND USE OF THE POWDER

CROSS REFERENCE TO RELATED APPLICATION

This application is an application filed under 35 U.S.C. §111(a) claiming benefit pursuant to 35 U.S.C. §119(e)(1) of the filing date of the Provisional Application No. 60/443,529 filed on Jan. 30, 2003, pursuant to 35 U.S.C. §111(b).

TECHNICAL FIELD

The present invention relates to a method for modifying the surfaces of inorganic oxide particles; to powder obtained through the method, which exhibits excellent fillability, thermal conductivity, viscosity characteristics, and fluidity; and to use of the powder.

BACKGROUND ART

Conventionally, inorganic oxide powder has been employed as, for example, a filler for imparting to an object characteristics such as reinforcement, flame retardancy, high thermal conductivity, and insulating property, a filler for a semiconductor sealing material, a viscosity adjusting agent, a fluidity improving agent, or a charge regulating agent; or has been employed in, for example, a coating material composition or a cosmetic composition. Particularly, spherical inorganic oxide powder has been suitably employed as, for example, a filler of high thermal conductivity or a filler for a semiconductor sealing material, because the oxide powder exhibits excellent fillability and fluidity and is easy to handle. For example, spherical alumina is employed as a thermally conductive filler, by virtue of its high thermal conductivity, and spherical silica is employed as a filler for a semiconductor sealing material, by virtue of its high purity.

In a technique for producing spherical particles, an inorganic oxide serving as a raw material is brought into a high-temperature flame to thereby melt the oxide, and the thus-melted oxide is formed into spherical particles by means of surface tension of the melted oxide. Instead of an inorganic oxide, a metal may be employed as a raw material. In such a case, high-temperature oxidation and melting-spheroidization of a metal occur concurrently.

In connection with the aforementioned technique, among other methods, the following methods have been proposed: a method in which alumina powder and silica powder are simultaneously sprayed into a flame, so as to allow reaction between a sodium component of the alumina powder and the silica powder to proceed, thereby producing spherical alumina of low sodium content (Japanese Patent Application Laid-Open (kokai) No. 2001-199719); a method in which alloy powder is combusted in an oxygen-containing gas atmosphere, to thereby produce a spherical composite oxide (Japanese Patent Application Laid-Open (kokai) No. 63-185803); and a method in which a slurry of aluminum hydroxide powder or aluminum oxide powder is sprayed into a flame, and the resultant fine powder is collected at a temperature of 500° C. or higher (Japanese Patent Application Laid-Open (kokai) No. 2001-19425).

A surface treatment will next be described.

In general, the surfaces of inorganic particles exhibit hydrophilicity. In the case where inorganic particles serving as a filler are added to an organic polymer material, hydrophobicity must be imparted to the surfaces of the inorganic particles. When hydrophobicity is not imparted to the surface of the filler, sufficient adhesion fails to be established at the interface between the filler and the organic polymer material, and the filling ratio of the filler is lowered. In order to impart hydrophobicity to the surfaces of the inorganic particles, the particles are subjected to surface treatment by use of, for example, a silane coupling agent or a titanium coupling agent. Such a surface treatment agent has a molecular structure including a hydrophobic group such as an alkyl group, and a hydrolyzable functional group such as a methoxy group or an ethoxy group. When a methoxy group or an ethoxy group of such a surface treatment agent undergoes hydrolysis, for example, a silanol group is formed, and the thus-formed silanol group is bonded to the surfaces of the inorganic particles. Since the thus-bonded molecules of the surface treatment agent have a hydrophobic group such as an alkyl group, the surfaces of the inorganic particles exhibit high hydrophobicity. In general, the above-described surface treatment technique is widely employed (e.g., NUC Silane Coupling Agent Catalogue produced by Nippon Unicar Co., Ltd.).

Composite particles will next be described. In many cases, composite particles are formed through bonding between large-size particle (hereinafter referred to as "mother particles") and small-size particles (hereinafter referred to as "child particles"). Mother particles are employed for effectively obtaining functions of child particles. In the case where no great difference in particle size is observed between particles for forming composite particles, fine particles having functions of interest are called "child particles," and particles employed for effectively obtaining the functions are called "mother particles."

Mother particles are bonded to child particles by means of, for example, a high-speed gas impact technique for mechanically bonding mother particles to child particles (Japanese Patent Publication (kokoku) No. 3-2009 and Japanese Patent Application Laid-Open (kokai) No. 6-210152), or a mechanofusion technique (Japanese Patent No. 2672671). Specifically, such bonding is attained by means of, for example, a Hybridization System (registered trademark, product of Nara Machinery Co., Ltd.) or a Mechanofusion System (registered trademark, product of Hosokawa Micron Corporation). Examples of the apparatus employed for attaining such bonding include a rolling ball mill, a high-speed rolling mill, and a medium stirring mill. In any of these apparatuses, the surfaces of mother particles and child particles are activated by means of, for example, impact energy, friction energy, or shear energy of milling media, which energy is applied to the mother particles and child particles, whereby the mother particles are bonded to the child particles. During the course of such treatment, the mother particles may be milled and formed into fine particles.

An object of the present invention is to provide a novel method for modifying the surfaces of particles, which method enables production, at low cost, of a filler suitable for use in a highly viscous composition such as an organic polymer composition or a silicon-containing polymer composition. Conventionally, inorganic powder has been employed as a filler in a composition, in order to enhance characteristics of the composition, such as thermal conductivity, flame retardancy, and insulating property. In order to enhance such characteristics of the composition as much as possible, the inorganic powder (filler) is required to exhibit high fillability. Meanwhile, the inorganic powder must exhibit high fluidity, from the viewpoint of handling of the powder during the course of production of the composition. In view of the foregoing, a spherical filler of high fillability has preferentially been employed in a matrix, and adhesion of the filler to the matrix has been enhanced by subjecting the filler to surface treatment.

However, in a conventional technique, a process for producing spherical powder of high fillability is separated from a process for surface treatment of the powder, leading to very low productivity and high production cost. The reasons for such separation of the processes are as follows. Although production of spherical powder requires high-temperature thermal treatment, a conventional surface treatment agent undergoes decomposition at high temperature, and thus difficulty is encountered in carrying out production of the powder and surface treatment thereof in a single process.

SUMMARY OF THE INVENTION

The present inventors have performed extensive studies and, as a result have found that, when powder consisting of large-size particles (hereinafter may be referred to as "powder A") and powder consisting of small-size particles (hereinafter may be referred to as "powder B") are simultaneously brought into a high-temperature flame, to thereby deposit or bond particles of the powder B to the surfaces of particles of the powder A, or when inorganic oxide powder (hereinafter may be referred to as "powder A") is brought into a high-temperature flame formed by use of a combustible gas and a combustion-supporting gas, and the resultant powder is again brought into the high-temperature flame, to thereby modify the surface of the powder, there can be produced a powder product which, when kneaded with a highly viscous composition (e.g., an organic polymer composition or a silicon-containing polymer composition), exhibits the effect of reducing the viscosity of the composition to a very low level. The present invention has been accomplished on the basis of this finding.

According to the present invention, a highly viscous composition having a high filler content is readily produced.

Accordingly, the present invention provides the following.

(1) A surface modification method comprising bringing, into a high-temperature flame formed by use of a combustible gas and a combustion-supporting gas, inorganic oxide powder A having an average particle size falling within a range of 0.5 to 200 μm as measured by means of laser diffraction/scattering particle size analysis and inorganic oxide powder B having a particle size calculated on the basis of its BET specific surface area (hereinafter may be referred to simply as "BET-based particle size") of 100 nm or less, to thereby modify the surfaces of particles of the powder A by means of particles of the powder B.

(2) A surface modification method comprising bringing, into a high-temperature flame formed by use of a combustible gas and a combustion-supporting gas, inorganic oxide powder A having an average particle size falling within a range of 0.5 to 200 μm as measured by means of laser diffraction/scattering particle size analysis; and bringing again the resultant powder into a high-temperature flame formed by use of a combustible gas and a combustion-supporting gas, to thereby modify the surfaces of particles of the powder A.

(3) The surface modification method according to (1) or (2) above, wherein the combustible gas is any species selected from among methane, ethane, propane, ethylene, propylene, acetylene, butane, LPG, hydrogen, and carbon monoxide; or a gas mixture thereof.

(4) The surface modification method according to any one of (1) through (3) above, wherein the high-temperature flame is formed by a coaxial triple-tube burner having an innermost tube, an intermediate tube and an outermost tube, in which the powder or powders are passed through the innermost tube, a combustible gas is passed through the intermediate tube and a combustion-supporting gas is passed through the outermost tube.

(5) The surface modification method according to any one of (1) through (4) above, wherein powder A and powder B are sprayed into the flame together, optionally with a carrier gas.

(6) The surface modification method according to any one of (1) through (5) above, wherein powder A comprises particles of an oxide of Al, Mg, Ca, Ti, or Si, or particles of a mixed crystal of such oxides.

(7) The surface modification method according to any one of (1) through (6) above, wherein powder B comprises particles of an oxide of Al, Ti, or Si, or particles of a mixed crystal of such oxides.

(8) The surface modification method according to (6) or (7) above, wherein powder A comprises particles having a spherical degree of at least 0.7 as defined by the following formula [1]:

spherical degree=(the circumference of a circle having the same area as that of a projection image of a particle)/(the length of the contour of the projection image of the particle)  [1].

(9) The surface modification method according to any one of (6) through (8) above, wherein the BET-based particle size of powder B is 1/10 or less the average particle size of powder A as measured by means of laser diffraction/scattering particle size analysis.

(10) The surface modification method according to any one of (6) through (9) above, wherein the amount of powder A is 50 mass % to 99 mass % inclusive on the basis of the total mass of powder A and powder B.

(11) A powder obtained through a surface modification method as recited in any one of (6) through (10) above, which has an average particle size of 0.5 μm to 250 μm as measured by means of laser diffraction/scattering particle size analysis.

(12) The powder according to (11) above, which comprises particles having a spherical degree of at least 0.7 as defined by formula [1] described in (8) above.

(13) The powder according to (11) or (12) above, which has undergone surface treatment by use of an agent for imparting hydrophobicity to the surface of the powder (hereinafter the agent may be referred to simply as a "surface hydrophobization treatment agent").

(14) An organic polymer composition characterized by comprising an organic polymer and the powder as recited in any one of (11) through (13) above in an amount of 0.01 mass % to 90 mass % on the basis of the entire mass of the composition.

(15) A silicon-containing polymer composition characterized by comprising a silicon-containing polymer and the powder as recited in any one of (11) through (13) above in an amount of 0.01 mass % to 90 mass % on the basis of the entire mass of the composition.

(16) An organic polymer composition according to (14) above, wherein the organic polymer of the composition is at least one resin selected from the group consisting of a synthetic thermoplastic resin, a synthetic thermosetting resin, and a natural resin.

(17) The organic polymer composition or silicon-containing polymer composition according to any one of (14) through (16) above, which is in the form of a compound.

(18) The organic polymer composition or silicon-containing polymer composition according to any one of (14) through (16) above, which is in the form of a masterbatch.

(19) A molded product characterized by being formed through molding of an organic polymer composition or silicon-containing polymer composition as recited in any one of (14) through (18) above.

(20) A slurry characterized by comprising a powder as recited in any one of (11) through (13) above.

(21) A coating agent characterized by comprising the powder as recited in any one of (11) through (13) above.

(22) A coating material characterized by comprising the powder as recited in any one of (11) through (13) above.

(23) A structure characterized by comprising, on its surface, the powder as recited in any one of (11) through (13) above.

(24) The structure according to (23) above, wherein said structure is one selected from the group consisting of building materials, machinery, vehicles, glass products, electric appliances, agricultural materials, electronic apparatus, tools, tableware, bath products, toiletry products, furniture, clothing, cloth products, fibers, leather products, paper products, sporting goods, futon, containers, eyeglasses, signboards, piping, wiring, brackets, sanitary materials, automobile parts, outdoor goods, stockings, socks, gloves, and masks.

(25) A luminescent material comprising the powder as recited in any one of (11) through (13) above.

(26) A cosmetic composition comprising the powder as recited in any one of (11) through (13) above.

(27) The cosmetic composition according to (26) above, further comprising at least one selected from the group consisting of an oil, a whitening agent, a humectant, an anti-aging agent, an emollient, an extract, an anti-inflammatory agent, an antioxidant, a surfactant, a chelating agent, an antibacterial agent, a preservative, an amino acid, a sugar, an organic acid, an alcohol, an ester, fat and oil, a hydrocarbon, an anti-UV agent, and an inorganic powder.

(28) A method for producing a powder, which comprises a method as recited in any one of (1) through (9) above.

BEST MODES OF CARRYING OUT THE PREFERRED EMBODIMENTS

Figure 1:
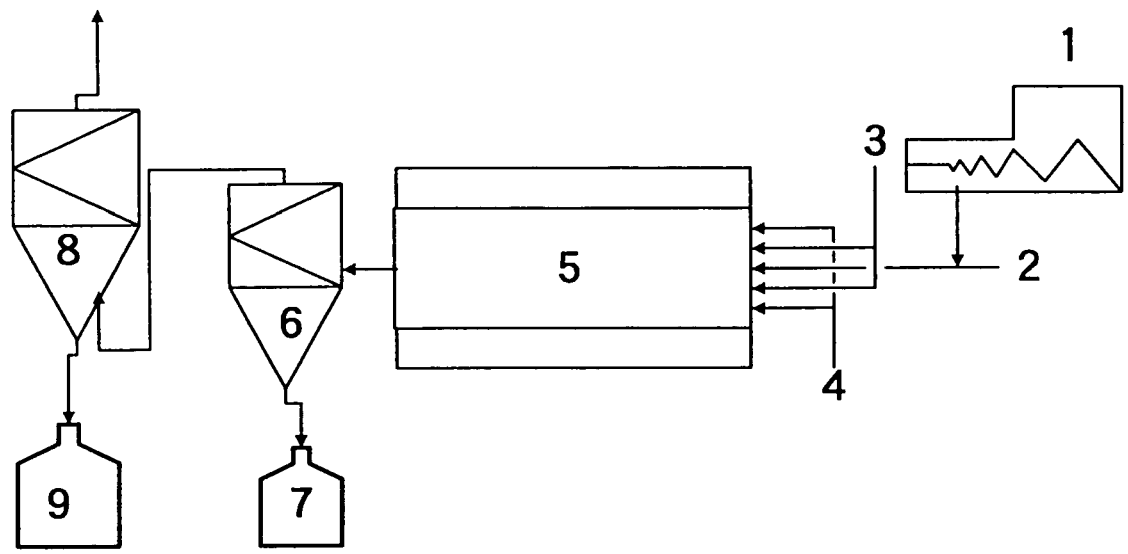
FIG. 1 is a schematic representation showing an exemplary reaction apparatus for carrying out the production method in the present invention.

The present invention will next be described in detail.

The powder surface modification method in the present invention, powder A and powder B can be brought into a high-temperature flame, to thereby modify the surfaces of particles of the powder A by means of particles of the powder B. The powder B particles do not necessarily uniformly cover the surface of each particle of the powder A while the powder B particles maintain their original shape, and components of the powder B particles may be discretely distributed over the surface of the powder A particle. Alternatively, the powder B particles may be melt-bonded, through heating, to the surface of each particle of the powder A such that the original shape of the powder B particles is not observed on the surface of the powder A particle. In such a case, the powder B particles exhibit remarkable effect of modifying the surface of the powder A. Therefore, conceivably, when the powder A and the powder B are simultaneously brought into a flame, the surfaces of the powder A particles are modified by means of the powder B particles. In general, in a high-temperature flame, association and growth of a plurality of particles occur, forming particles of large size. In the present invention, powder A and powder B are brought into the same high-temperature zone. However, as the powder B has a particle size smaller than that of the powder A, conceivably, the powder B has larger heat-receiving area, and melting of the powder B occurs more readily. Therefore, through regulation of, for example, the amount of a combustible gas to be combusted, conditions for suppressing association and growth of the powder A particles and for melt-bonding the powder B particles to the powder A particles can be determined. As is clear, the powder in the present invention is obtained through association or collision of the powder B particles with the powder A particles, and bonding of the powder B particles to the powder A particles. Even in the case where association between the powder B particles occurs, the thus-associated particles are highly likely to collide with and be bonded to the powder A particles before sufficient growth of the associated particles occurs. The reason for this is considered to be as follows. In a gas stream, small-size particles move much faster than large-size particles. Even in the case where the thus-associated and grown powder B particles collide with and are bonded to the powder A particles, when the ratio between the particle size of the powder A particles and that of the powder B particles falls within a predetermined range, the effect of modifying the surface of the powder A is obtained. In the method of the present mode, the surfaces of the powder A particles are modified through bonding of the powder B particles which have undergone flame treatment to the surfaces of the powder A particles. Therefore, even when the powder A is formed of the same material as the powder B, the surface modification effect is obtained. The form, crystal state, etc. of the powder B particles on the surfaces of the powder A particles can be controlled by regulating the flame treatment conditions. When the powder A and the powder B are formed of different materials, the surfaces of the powder A particles can be partially or entirely converted to have a chemical composition of the powder B.

The powder surface modification method in the present invention, powder A can be brought into a high-temperature flame several times, to thereby modify the surface of the powder A. In general, in the case where modification of the surfaces of particles is performed through one high-temperature flame treatment cycle, when merely the particle surfaces are to be modified, sufficient surface modification fails to be attained, whereas when sufficient surface modification is to be attained, the interior of the particles is adversely affected by heat, or the particles are melted to form large particles; i.e., difficulty is encountered in modifying merely the particle surfaces to a target level. In contrast, in the method of the present invention, in which powder is brought into a high-temperature flame several times, to thereby repeat modification of the surface of the powder, merely the surfaces of particles of the powder can be modified to a target level. The number of the high-temperature flame treatment cycle closely relates to the flame conditions and the melting point of powder to be treated. The optimal number of the treatment cycle varies with the temperature of a flame and the residence time of the powder within the flame. When the temperature of the flame is lowered, and the number of the treatment cycles is increased, the surface conditions of the powder is readily regulated, but production cost increases. In contrast, when the temperature of the flame is excessively high, the powder tends to undergo excessive thermal denaturation. Therefore, the optimal number of the treatment cycle is determined in consideration of balance between flame combustion conditions and powder surface treatment; specifically, is determined on the basis of the results of preliminary tests.

Powder A may be formed of particles of an oxide of, for example, Al, Mg, Ca, Ti, or Si, or particles of a mixed crystal of such oxides. For example, powder A may be formed of particles of aluminum oxide, magnesium oxide, calcium oxide, titanium oxide, silica, or a similar oxide, or particles of a mixed crystal of such oxides. Powder A has an average particle size of 0.5 to 200 µm, preferably 1 to 100 µm, more preferably 2 to 80 µm, as measured by use of a laser diffraction/scattering particle size analyzer. Particles of powder A may be obtained by any technique.

Powder A particles may assume any shape. However, preferably, powder A has a spherical degree of 0.7 or more, more preferably 0.85 or more, much more preferably 0.9 or more, as defined by the following formula [1]:

spherical degree=(the circumference of a circle having the same area as that of a projection image of a particle)/(the length of the contour of the projection image of the particle)     [1].

Powder B will now be described.

The particle size (BET-based particle size) of powder B is preferably 1/10 or less, more preferably 1/20 or less, the average particle size of powder A as measured by use of a laser diffraction/scattering particle size analyzer. When the particle size of powder B exceeds the above range, particles which have undergone surface modification have excessively rough surfaces, and the particles exhibit poor fillability. For example, when such particles are kneaded with a resin, the viscosity of the resultant resin composition fails to be lowered substantially. Powder B may be produced by means of, for example, a vapor-phase process in which a metal halide having a relatively low boiling point is gasified and decomposed, to thereby produce metal oxide powder (e.g., the following patent document: WO 01/16027). As is well known, such a process is used to produce alumina, titania, silica, or a composite product of such oxides. Powder produced through such a vapor-phase process has a chain structure in which primary particles are weakly point-bonded together to form a long chain. Oxide powder produced through the vapor-phase process is suitable as powder B, which serves as a raw material for the powder in the present invention, because the oxide powder has the aforementioned chain structure. The powder having the chain structure is sensitive to the resistance of gas flow, and is readily transported. The powder is sufficiently dispersed by the shearing force from gas flow, and then brought into a flame. Therefore, the powder is readily dispersed by means of a flame of a low Reynolds number, and the contact probability of the powder with powder A can be enhanced. In the case where transition alumina (e.g., γ-, δ-, η-, or κ-alumina)—which predominantly contains a low-temperature phase and has a melting point lower than that of α-alumina, which contains a high-temperature phase—is employed as powder B, when a powdery substance of high temperature phase is selected as powder A, for example, solely the powder B is readily melted.

Powder A and powder B are mixed together, and the resultant mixture is brought into a flame. Alternatively, powder A and powder B may be separately brought into a flame. When the ratio by amount between powder A and powder B is appropriately determined in accordance with the ratio between the particle size of powder A and that of powder B, preferred surface modification can be attained. The amount of powder A is preferably 50 mass % to 99 mass % inclusive, more preferably 60 mass % to 98 mass % inclusive, on the basis of the total mass of powder A and powder B. When these powders are brought into a flame, a carrier gas such as nitrogen or air may be employed. As these two powders of different particle sizes are mixed together, when the amount of a carrier gas is regulated such that the Reynolds number of the carrier gas which flows through an inlet tube is 3,000 to 80,000 inclusive, preferably 5,000 to 50,000 inclusive, these powders can be uniformly dispersed in a flame. When the Reynolds number is below the above range, sufficient mixing of the powders fails to be attained, whereas, when the Reynolds number exceeds the above range; i.e., when the amount of the carrier gas is increased, the temperature of a reaction zone is lowered.

A high-temperature zone is employed for bonding particles of powder B to the surfaces of particles of powder A. The simplest apparatus for generating a high-temperature zone is a burner. In the present invention, when the ratio between the flow rates of a combustible gas, an oxidative gas and a carrier gas is regulated, the length and temperature of a high-temperature zone can be regulated. Basically, any combustible gas may be employed in a burner. Preferably, the combustible gas is any species selected from among methane, ethane, propane, ethylene, propylene, acetylene, butane, LPG, hydrogen, and carbon monoxide; or a gas mixture thereof. More preferably, the combustible gas is LPG. Depending on the melting point of a substance to be subjected to surface modification, a combination of a combustion-supporting gas and a combustible gas which generates a large amount of combustion heat is appropriately determined. A critical point is to regulate the temperature of a combustion zone to a temperature nearly equal to the melting point of powder B. In the case where, for example, alumina powder, which has a high melting point, is employed as powder A and powder B, an LPG-oxygen burner or a hydrogen-oxygen burner can be employed.

No particular limitations are imposed on the structure of a burner to be employed, so long as powder can be brought through the burner into a flame. From the viewpoint of mixing efficiency and uniform treatment, the burner preferably has a coaxial triple-tube structure capable of simultaneously bringing powder A and powder B from the same nozzle into a flame. In the burner having such a structure, specifically, raw material powders are caused to pass through the innermost tube; a combustible gas such as LPG is caused to pass through the middle tube; and a combustion-supporting gas such as oxygen or air is caused to pass through the outermost tube. The combustion-supporting gas may be any oxygen-containing gas, but is preferably oxygen. Powder A and Powder B may be brought from different nozzles into a flame. Such a powder introduction form is advantageous in that the thermal history of powder A and the thermal history of powder B can be separately controlled by regulating, for example, the positions of the nozzles within a flame separately.

The flow rate of raw material/carrier gas spurted out from a nozzle is 3 m/second to 100 m/second inclusive (the flow rate is obtained by dividing the amount of a gas spurted out from a nozzle at a normal state ($Nm^3$/second) by the area of the spurt outlet of the nozzle ($m^2$), the same shall apply hereinafter), preferably 5 m/second to 80 m/second inclusive. The diameter of the innermost tube and other parameters are determined such that the tube Reynolds number becomes 3,000 or more, preferably 5,000 or more. Under the above conditions, in general, the raw material powder can be dispersed sufficiently. The flow rate of a combustible gas spurted out from a nozzle is determined to be 0.8 times to 4 times, preferably 0.9 times to twice, that of the spurted raw material/carrier gas. When the flow rate of the combustible gas is below the above range, a high-temperature zone is difficult to generate, whereas when the flow rate exceeds the above range, the raw material powder tends to remain within a high-temperature zone, and collision and growth of particles of the powder tend to occur, whereby the resultant powder contains large amounts of aggregated particles. The flow rate of an oxidative gas spurted out from a nozzle is determined to be 1 to 11 times, preferably 1.5 to 6 times, that of the spurted raw material/carrier gas. When the flow rates of these gases are regulated as described above, the shape of a combustion flame can be maintained suitable for producing the powder in the present invention.

The thus-produced powder is collected by use of, for example, a cyclone or a bag filter, whereby a final product is obtained. The thus-obtained powder product has an average particle size falling within a range of 0.5 to 250 μm as measured by means of a laser diffraction/scattering particle size analysis, and the surface thereof is modified by means of powder B particles.

Also, in the case where powder A is subjected to flame treatment several times, a production apparatus similar to that described above may be employed. Equipment conditions and production conditions (e.g., the flow rate of raw material/carrier gas spurted out from a nozzle) may be the same as those for modification of the surfaces of powder A particles by means of powder B particles.

Powder A which has been brought into a flame is quickly cooled, at the time, when only the surface thereof undergoes thermal modification. In general, the high-temperature zone of a flame is present only within a limited area of the flame, and therefore, an operation for quickly cooling the powder A is not necessarily performed. When sufficient surface modification effect is not obtained through one high-temperature flame treatment cycle, the powder A is subjected to the high-temperature flame treatment cycle several times. The optimal number of the treatment cycle is determined on the basis of the results of practical evaluation of a powder product which has been produced by bringing powder A into a flame several times.

The powder in the present invention may further be subjected to surface hydrophobization treatment. The powder which has undergone surface hydrophobization treatment exhibits improved affinity to, for example, a resin. An agent employed for such surface hydrophobization treatment may be a coupling agent such as an alkoxide of Si or Ti. The surface hydrophobization treatment is carried out by means of a generally employed surface hydrophobization treatment method; for example, a dry treatment method in which a surface treatment agent is added to powder, and the resultant mixture is stirred and heated, or a wet treatment method in which a surface treatment agent is added to an aqueous slurry containing powder.

The surface-modified powder in the present invention can be employed as a filler or a modifier for resin products and rubber products; or employed as an additive to paper, paint, and printing ink. Alternatively, the surface-modified powder can be employed, as inorganic oxide powder, in cosmetic compositions, ceramic products, electronic parts, luminescent materials, etc. Particularly, the surface-modified powder is suitable for use as, for example, a high thermally conductive filler requiring fillability and dispersibility to a medium.

The surface-modified powder in the present invention may be added to, for example, an organic polymer to thereby prepare a composition. Examples of the organic polymer include a synthetic thermoplastic resin, a synthetic thermosetting resin, and a natural resin. Specific examples of the organic polymer include polyolefins such as polyethylene, polypropylene, and polystyrene; polyamides such as nylon 6, nylon 66, and aramid; polyesters such as polyethylene terephthalate and unsaturated polyesters; polyvinyl chloride; polyvinylidene chloride; polyethylene oxide; polyethylene glycol; silicone resin; polyvinyl alcohol; vinylacetal resin; polyacetate; ABS resin; epoxy resin; imide-containing epoxy resin; vinyl acetate resin; cellulose derivatives such as cellulose and rayon; urethane resin; polycarbonate; urea resin; fluorine-containing resin; polyvinylidene fluoride; phenolic resin; celluloid; chitin; starch sheet; acrylic resin; melamine resin; and alkyd resin.

The surface-modified powder in the present invention may be added to, for example, a silicon-containing polymer to thereby prepare a composition.

The organic polymer composition or silicon-containing polymer composition containing the surface-modified powder of the present invention may be employed in the form of, for example, a coating composition, a compound (e.g., a resin composition containing the powder), or a masterbatch for a molded product containing a large amount of the powder. The organic polymer composition or silicon-containing polymer composition may contain an additive such as an antioxidant, an antistatic agent, and a fatty acid metallic salt.

The amount of the surface-modified powder in the present invention in the organic polymer composition or silicon-containing polymer composition varies in accordance with use of the composition. The amount of the powder is preferably 0.01 to 95 mass %, more preferably 20 to 90 mass %, on the basis of the entire mass of the composition.

The organic polymer composition or silicon-containing polymer composition can be subjected to molding, to thereby form, for example, fiber, film, and plastic molded products. Specific examples of such molded products include heat-storing fiber, heat-generating fiber, UV-shielding fiber, UV-shielding film, high thermally conductive material, high thermally conductive sheet, high thermally conductive film, insulating material, insulating film, and insulating sheet.

When the surface-modified powder in the present invention is dispersed in water or an organic solvent, and subsequently a binder is arbitrarily added to the resultant mixture, a coating agent can be prepared. No particular limitations are imposed on the binder material, and the binder material may be an organic or inorganic binder.

Examples of the organic binder include polyvinyl alcohol, melamine resin, urethane resin, celluloid, chitin, starch sheet, polyacrylamide, acrylamide, polyesters such as unsaturated polyesters, polyvinyl chloride, polyvinylidene chloride, polyethylene oxide, polyethylene glycol, silicone resin, vinylacetal resin, epoxy resin, vinyl acetate resin, urethane resin, urea resin, fluorine-containing resin, polyvinylidene fluoride, and phenolic resin. Examples of the inorganic binder include zirconium compounds such as zirconium oxychloride, zirconium hydroxychloride, zirconium nitrate, zirconium sulfate, zirconium acetate, ammonium zirconium carbonate, and zirconium propionate; silicon compounds such as alkoxysilane and silicate; and alkoxides of metals such as aluminum and titanium.

Specifically, the amount of the binder contained in the coating agent is preferably 0.01 mass % to 20 mass %, particularly preferably 1 mass % to 10 mass %.

When the amount of the binder is 0.01 mass % or less, adhesion of the coating agent becomes insufficient after coating, whereas when the amount of the binder exceeds 20 mass %, problems in terms of the viscosity of the agent arise, along with economical disadvantages.

The thus-produced powder in the present invention may be applied to the surface of a structure. No particular limitations are imposed on the structure to which the powder may be applied. For example, the structure may be formed from an inorganic material such as metal, concrete, glass, or ceramic; or an organic material such as paper, plastic, timber, or leather. Alternatively, the structure may be formed from a combination of an inorganic material and an organic material. Examples of the structure include building materials, machinery, vehicles, glass products, electric appliances, agricultural materials, electronic apparatus, tools, tableware, bath products, toiletry products, furniture, clothing, cloth products, fibers, leather products, paper products, sporting goods, futon, containers, eyeglasses, signboards, piping, wiring, brackets, sanitary materials, automobile parts, outdoor goods such as tents, stockings, socks, gloves, and masks.

No particular limitations are imposed on the method for applying the powder to the surface of a structure. For example, the aforementioned organic polymer composition, silicon-containing polymer composition, or coating agent may be applied directly to a structure, or may be applied onto a structure having a coating film thereon. In addition, another coating film may be formed on the structure coated with the powder.

The powder in the present invention may be incorporated into, for example, a cosmetic composition. When applied to the skin, a cosmetic composition containing the powder in the present invention provides excellent smoothness. The powder-containing cosmetic composition may contain an additive which is generally employed in a cosmetic composition, such as an oil, a whitening agent, a humectant, an anti-aging agent, an emollient, an extract, an anti-inflammatory agent, an antioxidant, a surfactant, a chelating agent, an antibacterial agent, a preservative, an amino acid, a sugar, an organic acid, an alcohol, an ester, fat and oil, a hydrocarbon, an anti-UV agent, or inorganic powder.

Specific examples of the additive which may be employed include solvents such as ethanol, isopropanol, butyl alcohol, and benzyl alcohol; polyhydric alcohols such as glycerin, propylene glycol, sorbitol, polyethylene glycol, dipropylene glycol, 1,3-butylene glycol, and 1,2-pentanediol; sugars such as sorbitol; disaccharides such as trehalose; humectants such as hyaluronic acid and water-soluble collagen; emollients such as hydrogenated squalane, vegetable oils (e.g., olive oil and jojoba oil), and ceramides; whitening agents such as stable ascorbic acid derivatives (e.g., magnesium ascorbate phosphate and ascorbic acid glycoside), arbutin, kojic acid, ellagic acid, Lucinol, and chamomile extract; anti-inflammatory agents such as allantoin, glycyrrhetinic acid, and salts of glycyrrhetinic acid; nonionic surfactants such as glycerin monostearate, POE sorbitan fatty acid esters, sorbitan fatty acid esters, POE alkyl ethers, POE-POP block polymers, and POE hydrogenated castor oil esters; anionic surfactants such as fatty acid soap and sodium alkyl sulfate; hydrocarbons such as squalane, liquid paraffin, paraffin, isoparaffin, vaseline, and α-olefin oligomers; fats and oils such as almond oil, cacao oil, macadamia nut oil, avocado oil, castor oil, sunflower oil, evening primrose oil, safflower oil, rapeseed oil, horse oil, beef tallow, and synthetic triglyceride; waxes such as beeswax, lanolin, and jojoba oil; fatty acids such as lauric acid, stearic acid, oleic acid, isostearic acid, myristic acid, palmitic acid, behenic acid, glycolic acid, and tartaric acid; higher alcohols such as cetanol, stearyl alcohol, behenyl alcohol, and octyldodecyl alcohol; synthetic esters such as gricerol triester and pentaerythritol tetraester; silicone oils such as dimethylpolysiloxane and methylphenylpolysiloxane; chelating agents such as EDTA, gluconic acid, phytic acid, and sodium polyphosphate; preservatives such as paraben, sorbic acid, isopropylmethylphenol, cresol, benzoic acid, ethyl benzoate, stearyldimethylbenzylammonium chloride, hinokitiol, furfural, and sodium pyrithione; bactericides; antioxidants such as vitamin E, dibutylhydroxytoluene, sodium hydrogensulfite, and butylhydroxyanisole; buffers such as citric acid, sodium citrate, lactic acid, and sodium lactate; amino acids such as glycine and alanine; esters such as butyl myristate, ethyl oleate, and ethyl stearate; perfumes; pigments; animal and plant extracts; vitamins such as vitamin A, vitamin Bs, and vitamin C, and derivatives thereof; UV-absorbing agents such as para-aminobenzoic acid, octyl para-dimethylaminobenzoate, ethyl para-aminobenzoate, phenyl salicylate, benzyl cinnamate, octyl methoxycinnamate, cinoxate, ethyl urocanate, hydroxymethoxybenzophenone, and dihydroxybenzophenone; inorganic powders such as mica, talc, kaolin, calcium carbonate, silicic acid anhydride, aluminum oxide, magnesium carbonate, barium sulfate, cerium oxide, red iron oxide, chromium oxide, ultramarine, black iron oxide, and yellow iron oxide; and resin powders such as nylon powder and polymethyl methacrylate powder.

All the components of the cosmetic composition in the present invention, except for the powder in the present invention, can be produced by means of a generally employed technique.

FIG. 1 schematically shows a typical production apparatus for carrying out the present invention, but the production apparatus which can be employed in the present invention is not limited to the apparatus shown in FIG. 1. The present invention will next be described with reference to this figure.

Reference numeral 1 denotes a feeder/hopper for feeding, into a flame, a predetermined amount of a mixture of powder A and powder B or a predetermined amount of powder A. Reference numeral 2 denotes a carrier gas for transporting the raw material powder into a flame. For example, air or nitrogen gas is employed as the carrier gas. More uniform mixing of the powder A and the powder B is attained by means of the carrier gas. The carrier gas must assume a turbulent state. The diameter of a tube through which the carrier gas passes and the flow rate of the carrier gas are determined such that the tube Reynolds number of the carrier gas becomes 3,000 to 80,000 inclusive, preferably 5,000 to 50,000 inclusive.

Reference numeral 3 denotes a combustible gas for forming a combustion flame, and reference numeral 4 denotes a combustion-supporting gas (may be referred to as "oxidative gas"). The carrier gas containing the raw material powder, the combustible gas, and the combustion-supporting gas are brought into a combustion tube 5, to thereby form a flame. In order to form a stable flame, preferably, a combustion tube of coaxial triple-tube structure is employed; the raw material-containing carrier gas is caused to flow through the innermost tube, the combustion-supporting gas is caused to flow through the outermost tube, and the combustible gas is caused to flow through the middle tube. The combustion-supporting gas may be divided into a plurality of portions, before being brought into the combustion tube. As the temperature of the combustion tube 5 changes drastically, the tube is preferably formed of, for example, a stainless steel tube equipped with a water cooling jacket. A ceramic tube is not suitable as the combustion tube, as it does not exhibit resistance to drastic change in temperature. Powder produced in the combustion tube 5 is trapped in a cyclone 6, and then collected in a product hopper 7. The powder which remains in the cyclone 6 after classification is trapped in a bag filter 8, and then collected in a fine powder hopper 9. The powder collected in the fine powder hopper 9 can be recycled as a raw material. A combustion exhaust gas is discharged to the outside of the apparatus.

In the case where powder A is subjected to the flame treatment several times, powder collected in the product hopper 7 is fed into the hopper 1, and is again brought into the flame. The powder obtained through this procedure is collected as a final product in the product hopper 7. By means of repetition of this procedure, the flame treatment is performed several times.

EXAMPLES

The present invention will be described with reference to Examples and Comparative Examples, but the present invention is not limited to the Examples.

Example 1

Gaseous titanium tetrachloride (concentration: 100%) was preliminarily heated to 1,000° C. Separately, a gas mixture of oxygen (96 vol. %) and steam (4 vol. %) was preliminarily heated to 1,000° C. The titanium tetrachloride gas and the gas mixture were brought into a reaction tube through a coaxial parallel-flow nozzle at flow rates of 45 m/second and 50 m/second, respectively. The titanium tetrachloride gas was fed through the inner tube. The flow rates of the titanium tetrachloride gas and the gas mixture in the reaction tube were found to be 8 m/second (calculated value) at a reaction temperature of 1,630° C. Cooling air was brought into the reaction tube such that the high-temperature residence time of the resultant reaction mixture was 0.1 seconds or less in the reaction tube. Thereafter, the thus-produced titanium dioxide powder was collected by use of a polytetrafluoroethylene-made bag filter.

The thus-produced titanium dioxide powder was found to have a BET-based particle size of 260 nm and an average particle size of 0.6 μm as measured by use of a laser diffraction/scattering particle size analyzer. The titanium dioxide powder was employed as powder B.

Figure 2:
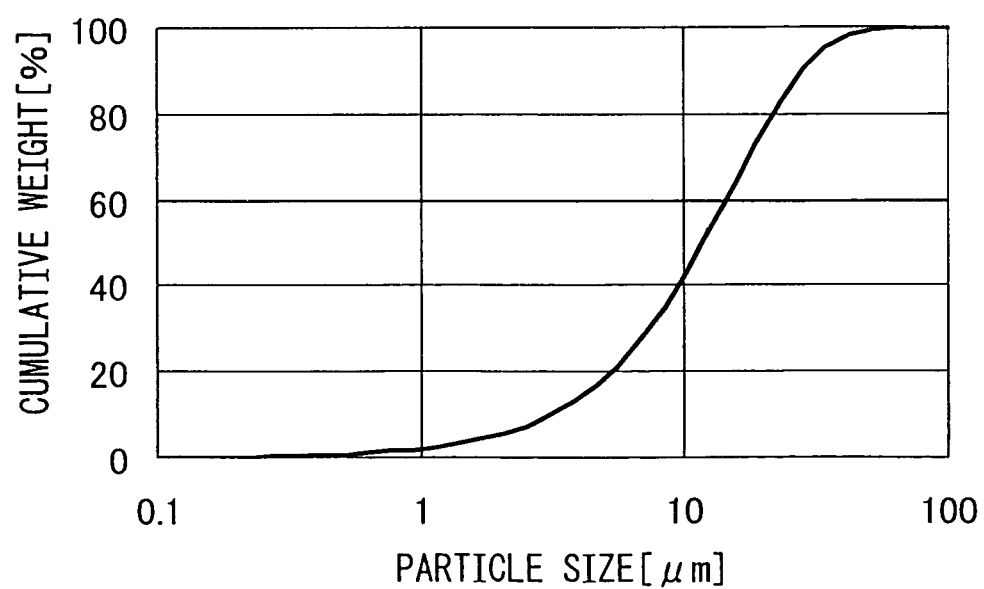
FIG. 2 shows the cumulative particle size distribution of powder A employed as a raw material in Examples 1 and 2.
Figure 3:
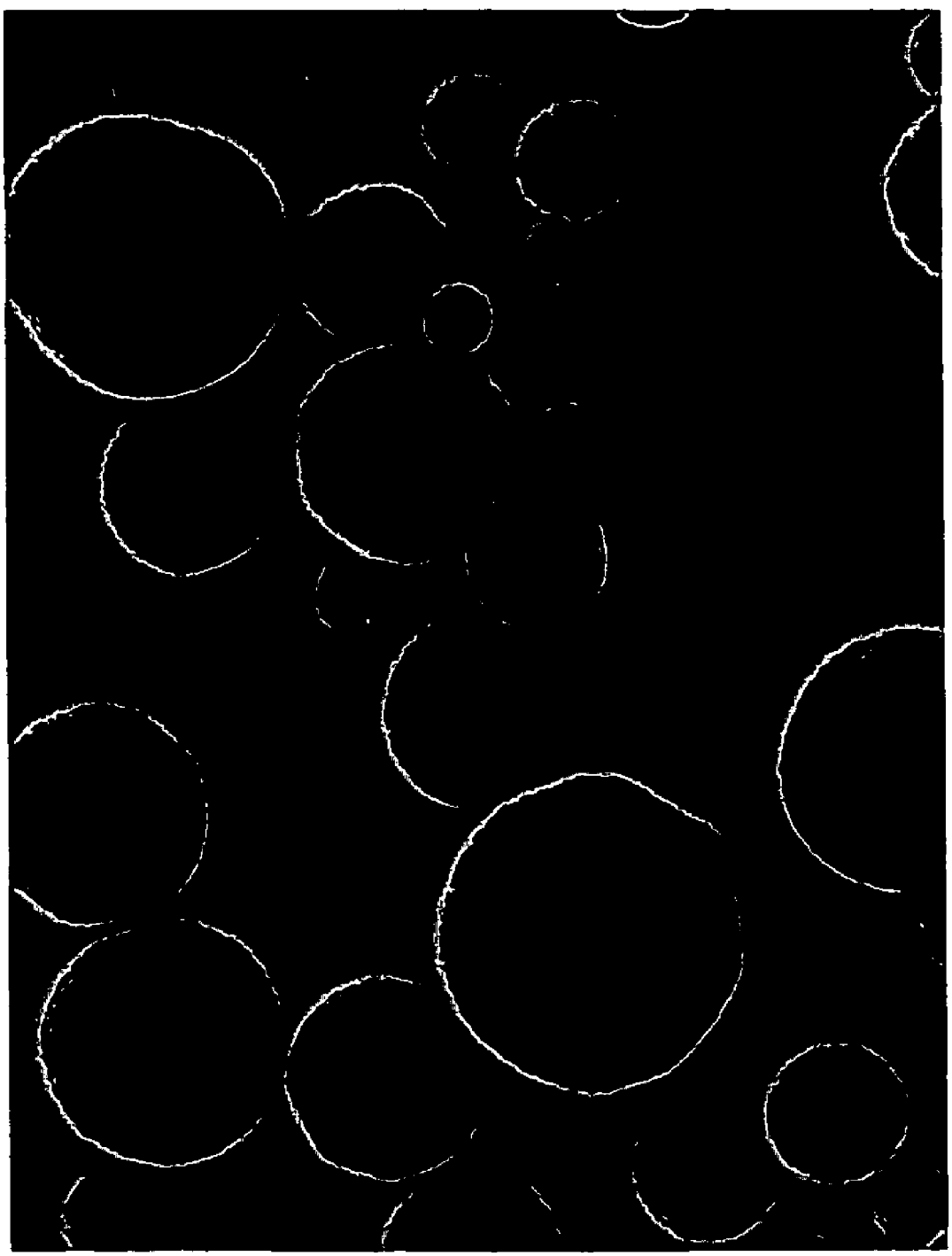
FIG. 3 is an electron micrograph showing the shape of particles of the raw material powder A employed in Examples 1 and 2.
Figure 4:
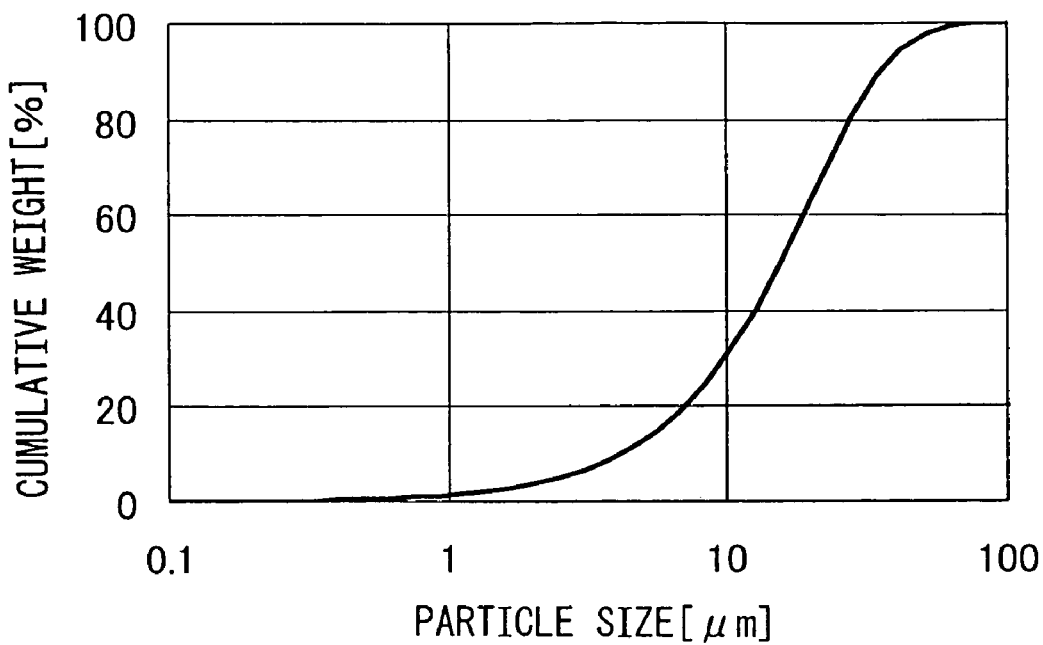
FIG. 4 shows the cumulative particle size distribution of the surface-modified powder produced in Example 1.

True spherical alumina powder having an average particle size of 11 μm as measured by use of a laser diffraction/scattering particle size analyzer was employed as powder A. The true spherical alumina powder was produced through the flame fusion process from alumina powder having an average particle size of 10 μm produced by means of the Bayer method. The true spherical alumina powder was found to have an α-alumina content of 70%. FIG. 2 shows the particle size distribution of particles of the powder A, and FIG. 3 shows the shape of the powder A particles.

The powder A was produced under the following production conditions: flow rate of a carrier gas spurted out from a nozzle: 40 m/second, tube Reynolds number: 8,000, combustible gas: LPG, flow rate of the combustible gas spurted out from a nozzle: 60 m/second, oxidative gas: oxygen, flow rate of the oxidative gas spurted out from a nozzle: 80 m/second. A sufficient amount of oxygen was brought into a reaction tube such that LPG was theoretically completely combusted by means of the oxygen. The alumina powder having an average particle size of 10 μm produced by means of the Bayer method was brought into the reaction tube together with the carrier gas, to thereby produce the true spherical alumina powder having an average particle size of 11 μm.

The powder A and the powder B were subjected to thermal treatment as described below. LPG was spurted out from the nozzle of the middle tube of a coaxial triple-tube burner at a flow rate of 60 m/second, and oxygen was spurted out from the nozzle of the outermost tube of the burner at a flow rate of 80 m/second, to thereby form a combustion flame.

The powder A and the powder B were vibration-mixed together in a resin bag such that the ratio by mass of the powder A to the powder B was 9:1, and then the resultant mixture was fed into a raw material hopper. The powder mixture was fed through the innermost tube at a feed rate of 6 kg/hour together with air serving as a carrier gas, and spurted out from the nozzle of the tube to the above-formed combustion flame. The flow rate of the carrier gas containing the raw material powders spurted out from the nozzle was 43 m/second, and the tube Reynolds number of the carrier gas was 12,000. The thus-combusted gas containing the solid was subjected to solid-gas separation in a cyclone, and the resultant powder was collected. The thus-obtained powder had a white color and a spherical shape. The powder was subjected to particle size analysis by use of a laser diffraction/scattering particle size analyzer (model: SALD-2000J, product of Shimadzu Corporation), and the average particle size of the powder was found to be 14 μm. The α-alumina content of the powder was obtained on the basis of an XRD peak corresponding to alumina, and was found to be 47%. FIG. 3 shows the particle size distribution of particles of the powder. As is clear from this figure, the particle size distribution of the powder particles is almost the same as that of the raw material powder particles (FIG. 2).

The thus-obtained powder (250 parts by mass) and an epoxy resin (epoxy resin AER-250, product of Asahi Kasei Corporation) (100 parts by mass) were subjected to kneading for five minutes and then to defoaming for one minute by use of an autorotation/revolution-system kneading/defoaming machine (Awatori Rentaro AR-250, product of Thinky Corporation). After the temperature of the resultant product was adjusted to 25° C., the viscosity of the product was measured by use of a B-type viscometer. The viscosity was found to be 1,500 cP.

Example 2

Gaseous aluminum chloride which had been diluted with nitrogen (concentration of aluminum chloride: 60%) was heated to 1,000° C. Separately, a gas mixture of oxygen (40 vol. %) and steam (60 vol. %) was heated to 1,000° C. The aluminum chloride gas and the gas mixture were brought into a reaction tube through a coaxial parallel-flow nozzle at flow rates of 40 m/second and 30 m/second, respectively. The aluminum chloride gas was fed through the inner tube. After completion of reaction, cooling air was brought into the reaction tube such that the high-temperature residence time of the resultant reaction mixture was 0.1 seconds or less in the reaction tube. Thereafter, the thus-produced alumina powder was collected by use of a polytetrafluoroethylene-made bag filter.

The thus-produced aluminum oxide powder was found to have a BET-based particle size of 37 nm and to predominantly contain a δ-alumina crystal phase. The aluminum oxide powder was employed as powder B (raw material).

True spherical alumina powder having an average particle size of 11 μm as measured by use of a laser diffraction/scattering particle size analyzer was employed as powder A. The true spherical alumina powder was produced through the flame fusion process from alumina powder having an average particle size of 10 μm produced by means of the Bayer method. The true spherical alumina powder was found to have an α-alumina content of 71%. The true spherical alumina powder is the same as the powder A employed in Example 1.

The powder A and the powder B were subjected to thermal treatment as described below. LPG was spurted out from the nozzle of the middle tube of a coaxial triple-tube burner at a flow rate of 60 m/second, and oxygen was spurted out from the nozzle of the outermost tube of the burner at a flow rate of 80 m/second, to thereby form a combustion flame.

Figure 5:
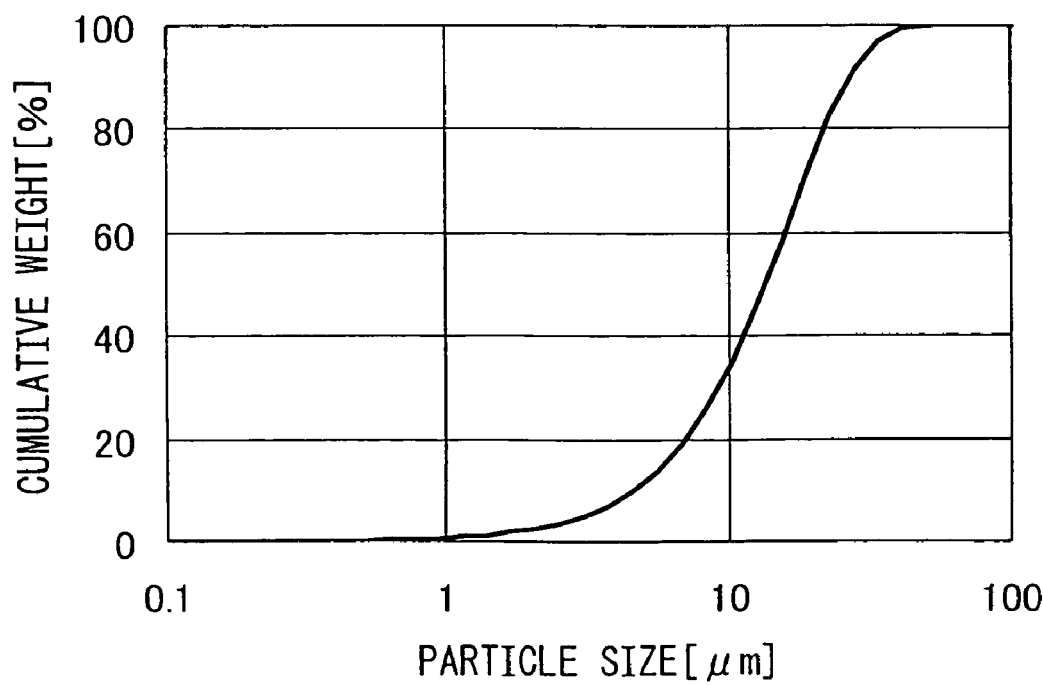
FIG. 5 shows the cumulative particle size distribution of the surface-modified powder produced in Example 2.
Figure 6:
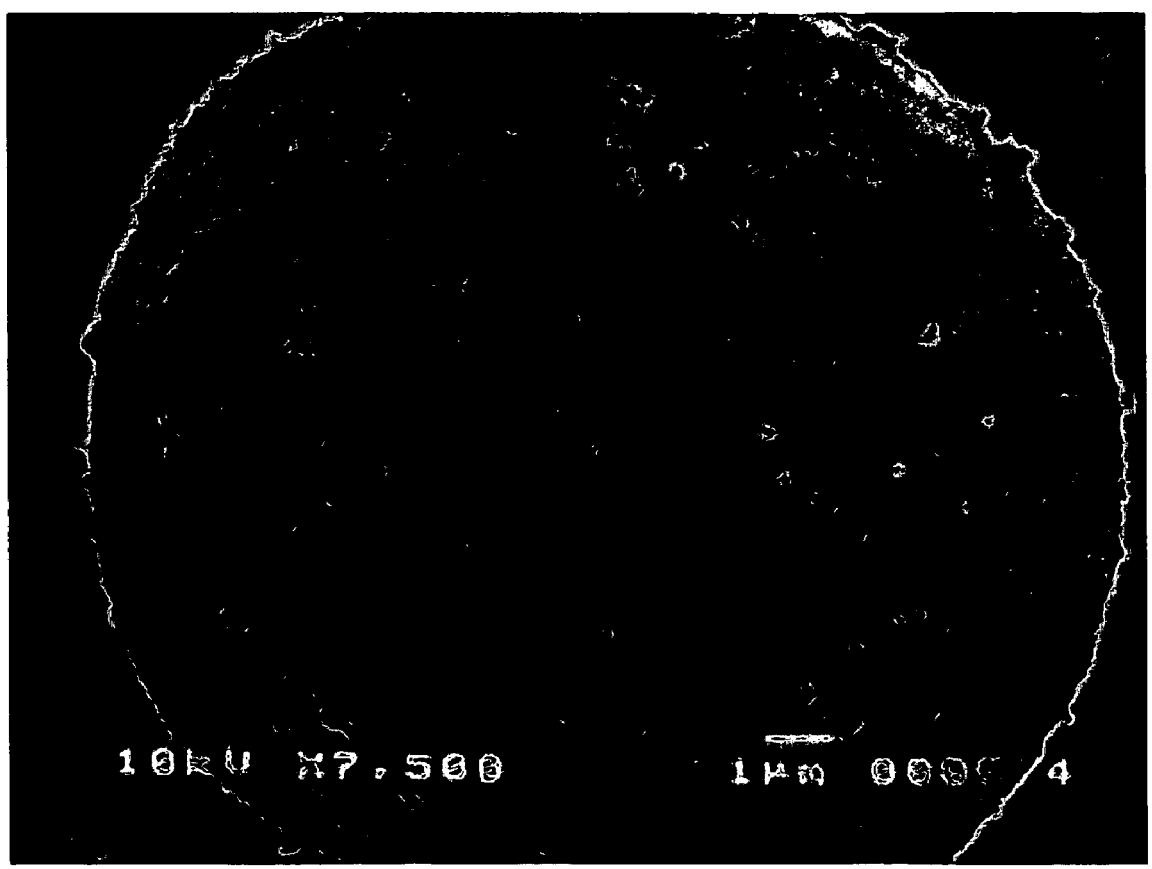
FIG. 6 is an electron micrograph of a particle of the surface-modified powder produced in Example 2.

The powder A and the powder B were vibration-mixed together in a resin bag such that the ratio by mass of the powder A to the powder B was 8:2, and then the resultant mixture was fed into a raw material hopper. The powder mixture was fed through the innermost tube at a feed rate of 4 kg/hour together with air serving as a carrier gas, and spurted out from the nozzle of the tube to the above-formed combustion flame. The flow rate of the air spurted out from the nozzle was 48 m/second, and the tube Reynolds number of the air was 14,000. The thus-combusted gas containing the solid was subjected to solid-gas separation in a cyclone, and the resultant powder was collected. The resultant surface-modified powder had a white color and a spherical shape. The powder was subjected to particle size analysis by use of a laser diffraction/scattering particle size analyzer (model: SALD-2000J, product of Shimadzu Corporation), and the average particle size of the powder was found to be 13 μm. The α-alumina content of the powder was found to be 42%. FIG. 5 shows the particle size distribution of particles of the thus-obtained powder, and FIG. 6 shows an SEM photograph of a particle of the powder.

In a manner similar to that of Example 1, the above-obtained powder (250 g) and an epoxy resin (epoxy resin AER-250) (100 g) were subjected to kneading for five minutes and then to defoaming for one minute. After the temperature of the resultant product was adjusted to 25° C., the viscosity of the product was measured by use of a B-type viscometer. The viscosity was found to be 1,140 cP.

Example 3

Gaseous aluminum chloride which had been diluted with nitrogen (concentration of aluminum chloride: 26%) was preliminarily heated to 1,000° C. Separately, a gas mixture of oxygen (35 vol. %) and steam (65 vol. %) was preliminarily heated to 1,000° C. The aluminum chloride gas and the gas mixture were brought into a reaction tube through a coaxial parallel-flow nozzle at flow rates of 61 m/second and 55 m/second, respectively. The aluminum chloride gas was fed through the inner tube. After completion of reaction, cooling air was brought into the reaction tube such that the high-temperature residence time of the resultant reaction mixture was 0.1 seconds or less in the reaction tube. Thereafter, the thus-produced alumina powder was collected by use of a polytetrafluoroethylene-made bag filter.

The thus-produced aluminum oxide powder was found to have a BET-based particle size of 15 nm and to predominantly contain a γ-alumina crystal phase. The aluminum oxide powder was employed as powder B (raw material).

Round-shaped alumina powder (AS-20, product of Showa Denko K.K.) having an average particle size of 22 μm, as measured by use of a laser particle size analyzer, was employed as powder A.

Subsequently, LPG was spurted out from the nozzle of the middle tube of a coaxial triple-tube burner at a flow rate of 45 m/second, and oxygen was spurted out from the nozzle of the outermost tube of the burner at a flow rate of 73 m/second, to thereby form a combustion flame.

The powder A and the powder B were mixed together such that the ratio by mass of the powder A to the powder B was 9:1, and then the resultant mixture was fed into a raw material hopper. The powder mixture was fed through the innermost tube at a feed rate of 4 kg/hour together with air serving as a carrier gas, and spurted out from the nozzle of the tube to the above-formed combustion flame. The flow rate of the air spurted out from the nozzle was 20 m/second, and the tube Reynolds number of the air was 6,000. The thus-combusted gas containing the solid was subjected to solid-gas separation in a cyclone, and the resultant powder was collected. The resultant surface-modified powder had a white color and a spherical shape. The powder was subjected to particle size analysis by use of a laser diffraction/scattering particle size analyzer (model: SALD-2000J, product of Shimadzu Corporation), and the average particle size of the powder was found to be 25 μm. The α-alumina content of the powder was found to be 78%.

In a manner similar to that of Example 1, the above-obtained powder (250 g) and an epoxy resin (epoxy resin AER-250) (100 g) were subjected to kneading for five minutes and then to defoaming for one minute. After the temperature of the resultant product was adjusted to 25° C., the viscosity of the product was measured by use of a B-type viscometer. The viscosity was found to be 730 cP.

Example 4

As powder A (raw material), there was employed the powder A employed in Example 2, which had been subjected to thermal treatment once. LPG was spurted out from the nozzle of the middle tube of a coaxial triple-tube burner at a flow rate of 60 m/second, and oxygen was spurted out from the nozzle of the outermost tube of the burner at a flow rate of 80 m/second, to thereby form a combustion flame. The powder A was brought into the thus-formed combustion flame.

The raw material powder was fed through the innermost tube at a feed rate of 4 kg/hour together with air serving as a carrier gas, and spurted out from the nozzle of the tube to the combustion flame. The flow rate of the air spurted out from the nozzle was 40 m/second, and the tube Reynolds number of the air was 18,000. The thus-combusted gas containing the solid was subjected to solid-gas separation in a cyclone, and the resultant powder was collected.

The thus-obtained powder assumed a white color and a spherical shape. The powder was subjected to particle size analysis by use of a laser diffraction/scattering particle size analyzer (model: SALD-2000J, product of Shimadzu Corporation), and the average particle size of the powder was found to be 13 μm. The α-alumina content of the powder was found to be 55%.

In a manner similar to that of Example 1, the above-obtained powder (250 g) and an epoxy resin (epoxy resin AER-250) (100 g) were subjected to kneading for five minutes and then to defoaming for one minute. After the temperature of the resultant product was adjusted to 25° C., the viscosity of the product was measured by use of a B-type viscometer. The viscosity was found to be 1,250 cP.

Comparative Example 1

The powder A and powder B employed in Example 1 were vibration-mixed together in a resin bag such that the ratio by mass of the powder A to the powder B was 9:1. The resultant powder mixture (250 g) and an epoxy resin (epoxy resin AER-250, product of Asahi Kasei Corporation) (100 g) were subjected to kneading for five minutes and then to defoaming for one minute by use of an autorotation/revolution-system kneading/defoaming machine (Awatori Rentaro AR-250, product of Thinky Corporation). After the temperature of the resultant product was adjusted to 25° C., the viscosity of the product was measured by use of a B-type viscometer. The viscosity was found to be 5,000 cP or more. In a manner similar to that described above, a product containing the powder A and the aforementioned epoxy resin was prepared, and the viscosity of the product was measured. The viscosity was found to be 5,000 cP or more.

Comparative Example 2

The powder A and powder B employed in Example 2 were vibration-mixed together in a resin bag such that the ratio by mass of the powder A to the powder B was 8:2. The resultant powder mixture (250 g) and an epoxy resin (epoxy resin AER-250, product of Asahi Kasei Corporation) (100 g) were subjected to kneading for five minutes and then to defoaming for one minute by use of an autorotation/revolution-system kneading/defoaming machine (Awatori Rentaro AR-250, product of Thinky Corporation). After the temperature of the resultant product was adjusted to 25° C., the viscosity of the product was measured by use of a B-type viscometer. The viscosity was found to be 5,000 cP or more.

Comparative Example 3

The powder A and powder B employed in Example 3 were vibration-mixed together in a resin bag such that the ratio by mass of the powder A to the powder B was 9:1. The resultant powder mixture (250 g) and an epoxy resin (epoxy resin AER-250, product of Asahi Kasei Corporation) (100 g) were subjected to kneading for five minutes and then to defoaming for one minute by use of an autorotation/revolution-system kneading/defoaming machine (Awatori Rentaro AR-250, product of Thinky Corporation). After the temperature of the resultant product was adjusted to 25° C., the viscosity of the product was measured by use of a B-type viscometer. The viscosity was found to be 5,000 cP or more. In a manner similar to that described above, a product containing the powder A and the aforementioned epoxy resin was prepared, and the viscosity of the product was measured. The viscosity was found to be 4,200 cP.

INDUSTRIAL APPLICABILITY

The present invention provides a novel method for modifying the surfaces of particles, which can modify only the surfaces of particles to a target level by means of high-temperature flame treatment. When powder which has undergone surface modification through this novel method is kneaded with a highly viscous composition (e.g., an organic polymer composition or a silicon-containing polymer composition), the surface-modified powder exhibits the effect of sufficiently lowering the viscosity of the resultant composition, as compared with powder which has not undergone such surface modification. Therefore, even when the amount of the surface-modified powder in the composition is increased, molding of the composition can be readily performed. Thus, the surface-modified powder is very useful as, for example, a thermally-conductive filler, an insulating filler, or a heat-resistant filler, which requires high fillability. Furthermore, by virtue of its high fluidity, the surface-modified powder is suitable for use in, for example, a coating material or a cosmetic composition. In addition, the surface-modified powder can be employed in, for example, a raw material for a ceramic molded product or a luminescent material.

The invention claimed is:

1. A surface modification method comprising
   (a) bringing, into a high-temperature flame formed by use of a combustible gas and a combustion-supporting gas, inorganic oxide powder A having an average particle size falling within a range of 0.5 to 200 μm as measured by means of laser diffraction/scattering particle size analysis; and
   (b) bringing again the resultant powder into a high-temperature flame formed by use of a combustible gas and a combustion-supporting gas,
   to thereby modify the surfaces of particles of powder A,
   wherein powder A comprises particles of an oxide of Al, Mg, Ca, Ti, or Si, or particles of a mixed crystal of such oxides, and
   wherein powder A comprises particles having a spherical degree of at least 0.7 as defined by the following formula [1]:

spherical degree=(the circumference of a circle having the same area as that of a projection image of a particle)/(the length of the contour of the projection image of the particle)  [1].

2. The surface modification method according to claim 1, wherein the combustible gas is any species selected from among methane, ethane, propane, ethylene, propylene, acetylene, butane, LPG, hydrogen, and carbon monoxide; or a gas mixture thereof.

3. The surface modification method according to claim 1, wherein the high-temperature flame is formed by a coaxial triple-tube burner having an innermost tube, an intermediate tube and an outermost tube, in which the powder or powders are passed through the innermost tube, a combustible gas is passed through the intermediate tube and a combustion-supporting gas is passed through the outermost tube.

4. The surface modification method according to claim 1, wherein, in (a), powder A and an inorganic oxide powder B are brought into the flame by spraying them into the flame together, optionally with a carrier gas.

5. The surface modification method according to claim 1, wherein, in (a), an inorganic oxide powder B is brought into the flame and comprises particles of an oxide of Al, Ti, or Si, or particles of a mixed crystal of such oxides.

6. The surface modification method according to claim 5, wherein the BET-based particle size of powder B is $\frac{1}{10}$ or less the average particle size of powder A as measured by means of laser diffraction/scattering particle size analysis.

7. The surface modification method according to claim 5, wherein the amount of powder A is 50 mass % to 99 mass % inclusive on the basis of the total mass of powder A and powder B.

* * * * *